US006822423B2

(12) United States Patent
Yau et al.

(10) Patent No.: US 6,822,423 B2
(45) Date of Patent: Nov. 23, 2004

(54) INTELLIGENT SERIAL BATTERY CHARGER AND CHARGING BLOCK

(75) Inventors: Kwok Wong Yau, New Territories (HK); Yiu Cheung Li, New Territories (HK); Long Bai, Shenzhen (CN)

(73) Assignee: GPE International Limited, New Territories (HK)

( * ) Notice: Subject to any disclaimer, the term of this patent is extended or adjusted under 35 U.S.C. 154(b) by 0 days.

(21) Appl. No.: 10/383,613

(22) Filed: Mar. 10, 2003

(65) Prior Publication Data

US 2003/0160593 A1 Aug. 28, 2003

Related U.S. Application Data

(63) Continuation-in-part of application No. 09/971,593, filed on Oct. 9, 2001, now Pat. No. 6,580,249.

(30) Foreign Application Priority Data

Sep. 3, 2001 (HK) .......................................... 01106195

(51) Int. Cl.[7] .................................................. H02J 7/00
(52) U.S. Cl. ..................................................... 320/122
(58) Field of Search ......................................... 320/122

(56) References Cited

U.S. PATENT DOCUMENTS

| | | | |
|---|---|---|---|
| 4,303,877 A | 12/1981 | Meinhold | 320/122 |
| 4,626,764 A | 12/1986 | Weinhardt | 320/107 |
| 4,691,157 A | 9/1987 | McDermott | 320/115 |
| 4,719,401 A | 1/1988 | Altmejd | 320/122 |
| 5,099,188 A | 3/1992 | Birnbreier et al. | 320/127 |
| 5,270,635 A | 12/1993 | Hoffman et al. | 320/122 |
| 5,650,240 A | 7/1997 | Rogers | 429/61 |
| 5,675,233 A | 10/1997 | Kaneko et al. | 320/163 |
| 5,744,936 A | 4/1998 | Kawakami | 320/120 |
| 5,773,962 A | 6/1998 | Nor | 320/134 |
| 5,804,944 A | 9/1998 | Alberkrack et al. | 320/163 |
| 5,850,136 A | 12/1998 | Kaneko | 320/119 |

(List continued on next page.)

FOREIGN PATENT DOCUMENTS

| | | |
|---|---|---|
| CN | 1138768 A | 12/1996 |
| CN | 1164771 A | 11/1997 |
| CN | 2384357 Y | 6/2000 |
| DE | 19705192 | 10/1997 |
| EP | 0798841 A2 | 10/1997 |
| JP | 7-163060 | 6/1995 |

OTHER PUBLICATIONS

Maxim Integrated Products, "*Maxim NiCd/NiMH Battery Fast–Charge Controllers*", Jan. 1997, 18 pps.

*Primary Examiner*—Pia Tibbita
(74) *Attorney, Agent, or Firm*—Burns, Doane, Swecker & Mathis, L.L.P.

(57) ABSTRACT

A battery charger including a plurality of battery charging sections which are connected in series and a charging current source, said charging section includes at least a first branch and a second branch which are connected in parallel, said first parallel branch includes an electronically controllable bypassing switch, said second parallel branch includes terminals for receiving the positive and negative terminals of a battery and a one-way electronic device which are connected in series, said bypassing switch has a very low impedance when activated or turned-on and a very high impedance when deactivated or turned-off, wherein said one-way electronic device is characterised by a very low-impedance when current flows from said charging section into said battery terminals and a high-impedance when said bypassing switch is activated, the battery in the charging section in which said bypassing switch is activated is substantially isolated electrically from the charging current, the other charging sections and the other batteries by said one-way electronic device.

20 Claims, 6 Drawing Sheets

U.S. PATENT DOCUMENTS

| | | | |
|---|---|---|---|
| 5,923,150 A | 7/1999 | Umetsu | 320/162 |
| 5,998,967 A | 12/1999 | Umeki et al. | 320/122 |
| 6,025,696 A | 2/2000 | Lenhart et al. | 320/122 |
| 6,034,506 A | 3/2000 | Hall | 320/117 |
| 6,046,514 A | 4/2000 | Rouillard et al. | 307/77 |
| 6,121,752 A | 9/2000 | Kitahara et al. | 320/122 |
| 6,211,650 B1 | 4/2001 | Mumaw et al. | 320/122 |
| 6,265,846 B1 | 7/2001 | Flechsig et al. | 320/116 |
| 6,271,646 B1 | 8/2001 | Evers et al. | 320/122 |
| 6,329,792 B1 | 12/2001 | Dunn et al. | 320/132 |
| 6,580,249 B2 * | 6/2003 | Yau et al. | 320/122 |

\* cited by examiner

INTELLIGENT SERIAL BATTERY CHARGER AND CHARGING BLOCK

This disclosure claims priority under 35 U.S.C. § 119 and/or 365 to 01106195.9 filed in Hong Kong on Sep. 3, 2001, and is a continuation-in-part of Ser. No. 09/971,593 filed in the United States of America on Oct. 9, 2001 now U.S. Pat. No. 6,580,249; the entire contents of which are hereby incorporated by reference.

FIELD OF THE INVENTION

The present invention relates to battery chargers for charging a plurality of rechargeable batteries connected in series. More particularly, this invention relates to battery chargers having a plurality of serially connected battery charging sections. More specifically, although not solely limiting thereto, this invention relates to serial battery chargers in which a battery in any one of the serially connected charging sections can be removed or bypassed without materially affecting the charging conditions of the batteries remaining in other charging sections of the serial battery charger. Furthermore, this invention relates to serial battery chargers in which there is utilized a simple electronic element which provides a low-impedance to the charging circuit during charging, a high-impedance to block reverse current flow from a battery when there is no power supply to the charging section and a comparatively high-impedance when the charging section is shunted or by-passed.

BACKGROUND OF THE INVENTION

Re-chargeable batteries are widely used in a lot of portable or mobile electrical and electronic devices or appliances such as, cellular or cordless telephones, remote repeaters, remote control units, remote sensors, portable lighting devices, portable radios, portable drills and many other devices. Re-chargeable batteries are generally preferred over disposable batteries nowadays because they are more environmental friendly and provide longer term cost savings. For remote applications, rechargeable batteries are probably the only practical choice.

Re-chargeable batteries require repeated charging in order to supply electrical power to the devices or appliances in which they are installed. Nowadays, portable devices usually require a plurality of batteries to operate and the batteries required are typically in the range of two to ten batteries. Hence, it is desirable that there can be provided intelligent battery chargers which can charge a plurality of re-chargeable batteries at the same time. There are two main types of battery chargers. The first type is the parallel charger in which all the batteries are subject to the same charging voltage but are charged with different charging currents. The other type is the serial charger in which the batteries being charged are connected in series and the same charging current usually passes through all the serially connected batteries.

In applications in which batteries are alternatively charged and discharged, a power supply of 3 to 12 volts is generally required while the voltage of each rechargeable battery is typically in the region of 1–2 volts. In those applications, batteries are typically connected in series for charging and discharging. For charging batteries for use in such applications, a serial battery charger must be used.

Because of the wide-spread use of rechargeable batteries, there are increasing demands for fast battery chargers which are capable of fully charging an empty battery in about an hour (the "1C" chargers) or less time so that users do not have to wait for too long before the batteries are sufficiently charged for use. For example, for a 1,600 mAH re-chargeable battery, the 1C current rate is about 1.6A and the 2C current rate is about 3.2A. In order to facilitate fast and efficient battery charging, battery chargers generally utilise high frequency pulsed charging current having a relatively high current rate. When a battery is being charged, it will produce oxygen on the electrode and the consumption of oxygen by the negative electrode will cause the battery to heat up. In general, charging at the current rate of 1C is preferred because this charging rate is regarded as striking a balance between reducing charging time and maintaining a healthy battery under current battery technologies. Of course, with further advance in battery technologies, batteries may be charged at even higher current ratings without over-heating. If that happens, battery chargers supplying higher charging rating than 1C will be expected to become more popular. In general, fast battery chargers, especially those for charging small voltage re-chargeable batteries of about 1.5–2V, are preferably configured so that the batteries are charged in series. This is because if the batteries are fast charged in parallel, a power supply having a very large current supply rating will be required and this may be very costly.

On the other hand, a serial connection implies that the same current must flow through each serially connected battery charging section. This may also create great difficulty in a lot of circumstances. For example, it may be necessary to remove or isolate a battery from the charger or the charging section upon completion of charging to avoid overheating or damaging or because it is already defective. When a battery is removed from a charging section or the charger, charging will usually be disrupted until a replacement battery has been inserted into the charger. Similar problems also arise if rechargeable batteries of different capacities are charged together or good batteries are mixed with bad ones. This is because when a battery of a smaller capacity has been fully charged, there is a good chance that a battery of a larger capacity still requires charging. For simple serial chargers with no monitoring and control circuits, the batteries will be continuously charged. As a result, overheating, battery damage or even explosion may result. On the other hand, for those more sophisticated serial battery chargers with charging conditions monitoring and charge control circuits, the battery charger may shut down once any one of the batteries being charged is detected as being fully charged. This is obviously undesirable as the remaining batteries may still require further charging. Furthermore, whenever batteries are inserted or removed from a serial battery charger during the charging process, the whole charging process will be interrupted. Hence, it is desirable if there can be provided intelligent serial battery chargers for serial charging of re-chargeable batteries in which the charging currents supplied to the individual batteries in serial connection are largely independent of that supplied to other batteries. In other words, it will be desirable if the charging conditions in a charging section of a serial battery charger comprising a plurality of serially connected charging sections can be substantially independent or isolated from other serial charging sections.

For many battery chargers, it is known that, when power supply to the battery charger is turned off, there may be a reverse leakage current which flows from the battery to the charger or the peripheral circuitry. Reverse leakage current among the serially connected batteries could also cause reverse charging of individual batteries by other batteries that are connected in the series charger. This is clearly an undesirable phenomenon which may cause draining of the full battery capacity and may even damage the charger. Hence, it is desirable that each charging section of a serial battery charger is provided with means to prevent undesirable reverse current leakage as well as a bypassing circuitry so that the charging conditions of one individual charging section would not affect the charging conditions of the other charging sections.

Many bypassing circuits, circuit arrangements or topologies have been proposed to alleviate the adverse influence of the charging conditions in a serial charging section to other charging sections. While serial chargers having arrangements to by-pass some or all of the charging sections have been known, they are generally very complicated and do not simultaneously include means or circuits to prevent reverse leakage or discharge from the batteries.

For example, in U.S. Pat. No. 6,121,752, there is described a battery assembly with a charging current control circuitry which includes a charging current bypassing circuit. The charging current bypassing circuit includes a switching means (50) that is series-coupled with a cell in the battery pack for controlling charging current to the individual cells and a current bypassing means (51) that is parallel-coupled across the switching means and the cell. The switching means and the current bypassing means are switched, i.e. turned ON and OFF, in a complementary fashion. However, in these configurations, when the switching means (50) is turned "ON" (i.e. closed or actuated), the cell is not prevented from adverse discharge via the switch (50) when an external load or a discharge path is connected. This is particularly problematic when the current bypassing means (51) is also momentarily closed, for example, due to delay or overlap in the control signals, as this may cause short-circuit of the cell through the switches 50 and 51 which may be hazardous. Hence, such configurations are unsatisfactory.

To provide a serial battery charger which fulfils the above requirements is a difficult task because several conflicting requirements need to be met. Firstly, in order to prevent reverse current leakage or adverse current discharge from the battery, a blocking device which has a high reverse impedance must be inserted in series with the battery. Secondly, that serial block device must have a low impedance when there is a forward current which flows into the battery for battery charging. On the other hand, if the blocking device has a low forward impedance when the bypassing switch has been activated (which usually occurs when there is still power supply to the battery charging terminals), that low-impedance blocking device will compete with the bypassing switch for the supplied current and, as a result, adverse charging current will keep flowing into the batteries. In addition, that blocking device must have a high impedance when the bypassing switch has been activated, otherwise, a large and un-desirable current will flow in a current loop which is formed by the battery, the blocking device and the bypassing switch. Hence, it is highly desirable if a serial battery charger which can fulfil the above conflicting requirements can be provided. It will be even more desirable if such improved battery chargers can be realised using simple circuit blocks and components so that high reliability as well as low costs can be achieved.

OBJECT OF THE INVENTION

It is therefore an object of the present invention to alleviate or obviate the problems or shortcomings associated with existing or known serial battery chargers. In particular, it is an object of the present invention to provide circuit arrangements for an improved battery charging section which can be used in serial chargers so that the charging section can be shunted or by-passed when selected and, at the same time, provided with blocking means to prevent reverse current.

An important object of the present invention is therefore to provide an intelligent serial battery charger in which the charging current or charging conditions of one battery or one of the charging sections in the serial connection are largely unaffected by the charging conditions of other batteries or other charging sections in the serial connection. This is particularly important so that a battery can be selectively removed or isolated from the charging section without adversely affecting other charging sections.

Another important object of the present invention is to provide a serial battery charger in which a battery can be removed or isolated from the serially connected battery charging sections without disrupting the charging of other batteries or other charging sections by providing a bypassing shunt and, at the same time, alleviating or avoiding adverse reverse current flow from the battery when the bypassing shunt has been activated.

As a minimum, it is an object of the present invention to provide the public with a choice of serial battery chargers which are provided with means to obviate or alleviate undesirable battery discharge when the battery charger is not supplying charging power and to provide useful battery by-pass as and when necessary.

SUMMARY OF THE INVENTION

A battery charger including a plurality of battery charging sections which are connected in series and a charging current source, said charging section includes at least a first branch and a second branch which are connected in parallel, said first parallel branch includes an electronically controllable bypassing switch, said second parallel branch includes terminals for receiving the positive and negative terminals of a battery and a one-way electronic device which are connected in series, said bypassing switch has a very low impedance when activated or turned-on and a very high impedance when deactivated or turned-off, wherein said one-way electronic device is characterised by a very low-impedance when current flows from said charging section into said battery terminals and a high-impedance when said bypassing switch is activated, said one-way electronic device allows charging current to flow into said battery but substantially prevents discharge of said battery through said one-way electronic device.

According to another aspect of the present invention, there is provided a serial battery charger including a battery charging section which includes at least first and second parallelly connected branches, wherein said first branch includes a diode serially connected with the terminals for connecting the battery to be charged and said second branch includes a MOSFET bypassing switch, said bypassing switch is connected across said first branch and provides low-impedance shunting when activated, said blocking diode has a low-impedance when current flows into said battery to be charged and has a high-impedance when there is no power supply from said battery charger or when said bypassing switch is turned on.

Preferably, said bypassing switches of said plurality of battery charging sections can be selectively activated and deactivated.

Preferably, said charging current source includes a constant current source and said charger further includes a micro-controller, said bypassing switches of said plurality of charging sections being selectively activatable by said micro-controller.

Preferably, said one-way electronic behaves as a current blocking device which substantially blocks current flowing in or out of a battery when the bypassing switch of that said charging section containing that said battery has been activated.

Preferably, the batteries in said plurality of charging sections can be selectively isolated from the charging sections by selective activation of said bypassing switches.

Preferably, said selectively isolated batteries are also isolated from batteries in other charging sections such that the isolated batteries will not significantly interfere electrically with the batteries in other charging sections.

Preferably, said charger including means for measuring the open-circuit electrical parameters of a battery in a charging section when the bypassing switch of that charging section has been selectively activated.

Preferably, said charger further including means for measuring the characteristic electrical parameters of a battery in a charging section by selective activation of the bypassing switches.

Preferably, the bypassing switch of a said charging section is connected in parallel with the serial connection of said battery terminals and said one-way electronic device of that charging section.

Preferably, the activation states of said bypassing switch and said one-way electronic device of the same charging section being opposite.

According to a preferred embodiment, said one-way electronic device includes a diode.

According to a preferred embodiment, said bypassing switch includes a three-terminal device in which the impedance across two of its terminals is controllable by a third terminal.

Preferably, said two of the terminals of said three-terminal device of a charging section are connected in parallel across the serial connection of said battery terminals and said one-way electronic device of the charging section.

According to a preferred embodiment, said three-terminal device includes a MOSFET with a relatively high switching bandwidth, the drain and source terminals of said MOSFET being connected in parallel with the serial connection of the battery terminals and the one-way electronic device of the charging section.

Preferably, said three-terminal device is a device having a relatively high switching bandwidth.

Preferably, said one-way electronic device includes a blocking device having a considerably higher impedance than that of the activated bypassing switch when said bypassing switch is turned on.

Preferably, said one-way electronic devices can be selectively activated or deactivated.

Preferably, said one-way electronic device includes a three-terminal device in which the impedance across two of its terminals is controllable by a third terminal.

Preferably, said third terminal of said three-terminal one-way electronic device being connected to the switching control terminal of said bypassing switch via an logic inversion means such as an invertor or a NAND gate.

Preferably, either said third terminal of said one-way electronic device and said third terminal of said bypassing switching is controllable by the same control port of a microcontroller.

Preferably, a logic inversion means is connected between said third terminals of said one-way electronic device and said bypassing switch.

According to a preferred embodiment, said one-way electronic device includes a Metal Oxide-Semiconductor Field Effect Transistor (MOSFET), said third terminals of said one-way electronic devices being the gate terminal.

Preferably, said one-way electronic device includes a diode, a MOSFET or like device.

Preferably, the battery in the charging section in which said bypassing switch is activated is substantially isolated electrically from the charging current, the other charging sections and the other batteries by said one-way electronic device.

BRIEF DESCRIPTION OF THE DRAWINGS

Preferred embodiments of the present invention will be explained in further detail by way of example and with reference to the accompanying drawings. In which.

DETAILED DESCRIPTION OF THE PREFERRED EMBODIMENT

Figure 1:
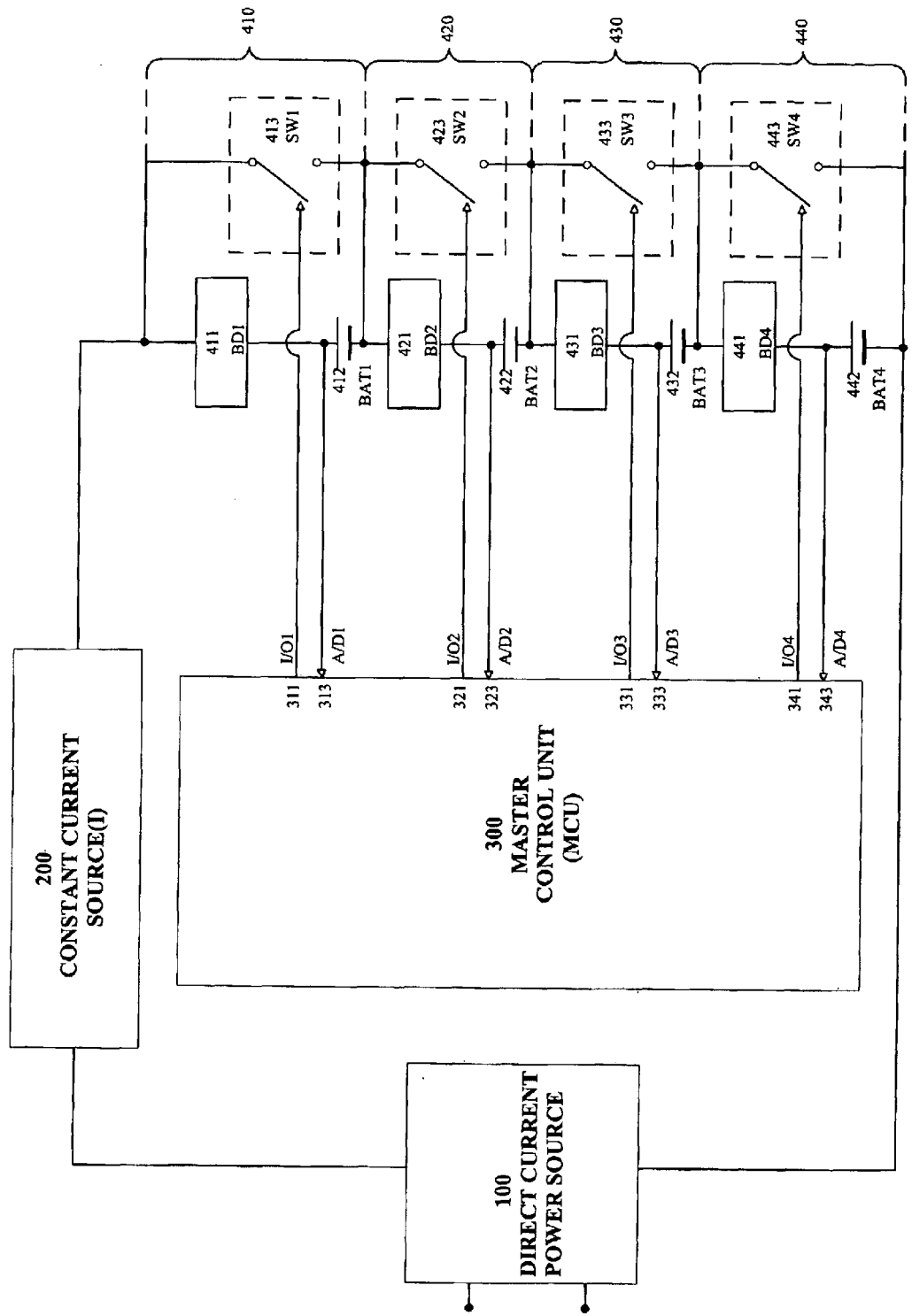
FIG. 1 is a general block circuit diagram of the serial battery charger of a preferred embodiment of the present invention.

Referring to FIG. 1, there is shown a block diagram showing a first example of a first preferred embodiment of the present invention of an intelligent serial battery charger. The battery charger includes a direct current power source (100), a constant current source (200), a micro-controller unit (300) and plurality of battery charging sections (410, 420, 430 and 440) connected in series. The serially connected battery charging sections are connected to the positive and negative terminals of the direct current power source (100) in order to obtain DC power of the correct polarity.

Referring to FIG. 1, each of the charging sections (410, 420, 430 and 440) includes a one-way electronic device which is connected in series with the positive and negative terminals of the battery in order to control charging connecting to a battery. In order to provide a controllable bypassing path which provides low impedance shunting across a charging section when necessary, for example, when the battery in a particular charging section is fully charged, defective or overheated, there is provided an electronic controllable switch (413) as shown in the Figure. The bypassing switch is connected in parallel with the serial connection of the battery terminals and the one-way electronic device. The bypassing switch provides low impedance shunting across the terminals of the serial connection of the one-way electronic device and the battery terminals when activated. In the present specific embodiments, the bypassing switch is a three-terminal device in which the impedance across two of its terminals is controllable by a third terminal.

The one-way electronic device which is inserted in series with the battery under charge should endeavour to fulfil the following conflicting requirements. Firstly, it is preferred to have a low-impedance when the battery is being charged (that is, when forward current flows into the battery). Secondly, it is preferred to have a high-impedance when there is no power supply from the charger or, in other words, when the voltage at the battery terminals exceeds that of the charging terminals in order to prevent adverse discharge or reverse current flow from the battery, otherwise, the batteries will be drained when there is no power supply from the direct current power source (100). Thirdly, the blocking device should have a very high impedance when the bypassing switch has been turned on because, otherwise, a current loop which is formed by the battery, the one-way device and the bypassing switch, may cause burning out of the circuit, since the bypassing switch should be of low-impedance in nature and the resulting current in the current loop will be very large. In addition, the blocking device should have a considerably higher impedance than that of the activated bypassing switch (i.e. when it has been turned on) when the bypassing switch has been activated and when the voltage at the charging terminals exceeds that of the battery, so that adverse current will not flow into the battery through the one-way electronic device.

In addition to merely providing a bypassing path, the combination of the electronically controllable bypassing switch together with the one-way electronic device allows high frequency and repeated open-circuit measurements across the battery terminals to be taken. Such open-circuit measurements are preferred in order to obtain sufficient battery parameters to assess the charging conditions of a battery. An example of how the open-circuit electrical parameters of the batteries can be taken will be explained below. For example, when the micro-controller (300) needs to read the open-circuit parameters of the battery (422) which is being charged in the second serial charging block (420), it sends out electronic control signals through its I/O ports to the control terminals of the three-terminal bypassing switches and turns on the bypassing switches 413, 433 and 443. As a result, the impedance across the two other terminals of the bypassing switches 413, 433 and 443 will be very low and the batteries 412, 432 and 442 will be substantially by-passed because of the high impedance of the blocking device in this circumstances.

When the bypassing switches 413, 433 and 443 have been activated, a measurement of the voltage taken across the positive terminal (A/D2 in FIG. 2) of the second battery (422) and the ground will give the characteristics of battery 422 only, since all the other batteries, namely, 412, 432 and 442, have been isolated from the measurement circuitry because of the isolation by the blocking devices 411, 431 and 441. It will be noted that, at this instant, the one-way electronic devices 411, 431 and 441 will isolate the batteries 412, 432 and 442 from the charging section and the open-circuit parameters of the battery 422 can then be measured.

After measurements have been taken, the micro-controller again sends out another control signal to the electronically controlled three-terminal switches 413, 433 and 443 so that the impedance across the two other terminals of the bypassing switches will again resume a high state to de-activate bypassing. As a result, current flows again through the one-way electronic device into the batteries being charged.

Alternatively, the second battery (422) can be measured by having the second bypassing switch (423) activated. At this instant, the second battery will be isolated and measurement can be taken across the battery terminals directly. Of course, additional analogue-digital converters will be needed to measure the potential difference across the two battery terminals. To ensure accurate measurement of the open-circuit parameters, it is highly desirable that when the bypassing switches are closed (activated), no current flows in or out of the batteries the associated bypassing switches of which have been activated, otherwise, the open-circuit readings will not be accurate.

In order to prevent current from flowing out of the battery when open-circuit or close-circuit measurements are to be taken, the one-way electronic device should have a very high impedance which is sufficient to prevent current from flowing out of the battery in the reverse direction when bypassing is activated, even if the voltage at the terminals of the charging section before and after the activation of the bypassing switch is higher than that of the battery. Simultaneously, it is also preferred to prevent or minimise the current which may flow into the battery terminals when the bypassing switch is turned on (or closed or activated, at which point the impedance across the two terminals of the bypassing switch is in the low state).

To prevent adverse flow of current from the power source into the battery when the bypassing switch is closed, the impedance of the one-way electronic device (411, 421, 431, 441) when the bypassing switch is closed should be significantly higher than that of the bypassing switch (413, 423, 433, 443). On the other hand, the one-way electronic device should have a very low-impedance where there is current supply from the charger and when the bypassing switch is opened so that the charging current will entirely flow into the battery via the one-way electronic device for charging. To provide an electronically controllable switch which has a high and a low-impedance state, a MOSFET is selected. In general, when a suitable gate voltage is applied to a MOSFET, the drain-source terminals of the MOSFET will become conducting with low-impedance. On the other hand, if a different gate voltage is applied, the drain-source terminals of the MOSFET will have a very high-impedance and become non-conducting. A MOSFET switch is selected as a bypassing switch because it has a relatively high bandwidth so that the bypassing switch can be turned on and off many times within a short period of time. Such repeated switching is required in order to take all the necessary open circuit measurements and readings. The high bandwidth is also preferred in order to take responsive action once any abnormality of a battery is observed and in order to minimise any noticeable disruption to the other charging sections when a battery is removed from the charger. Of course, other electronic devices exhibiting similar electronic characteristics may also be used as alternatives.

Figure 2:
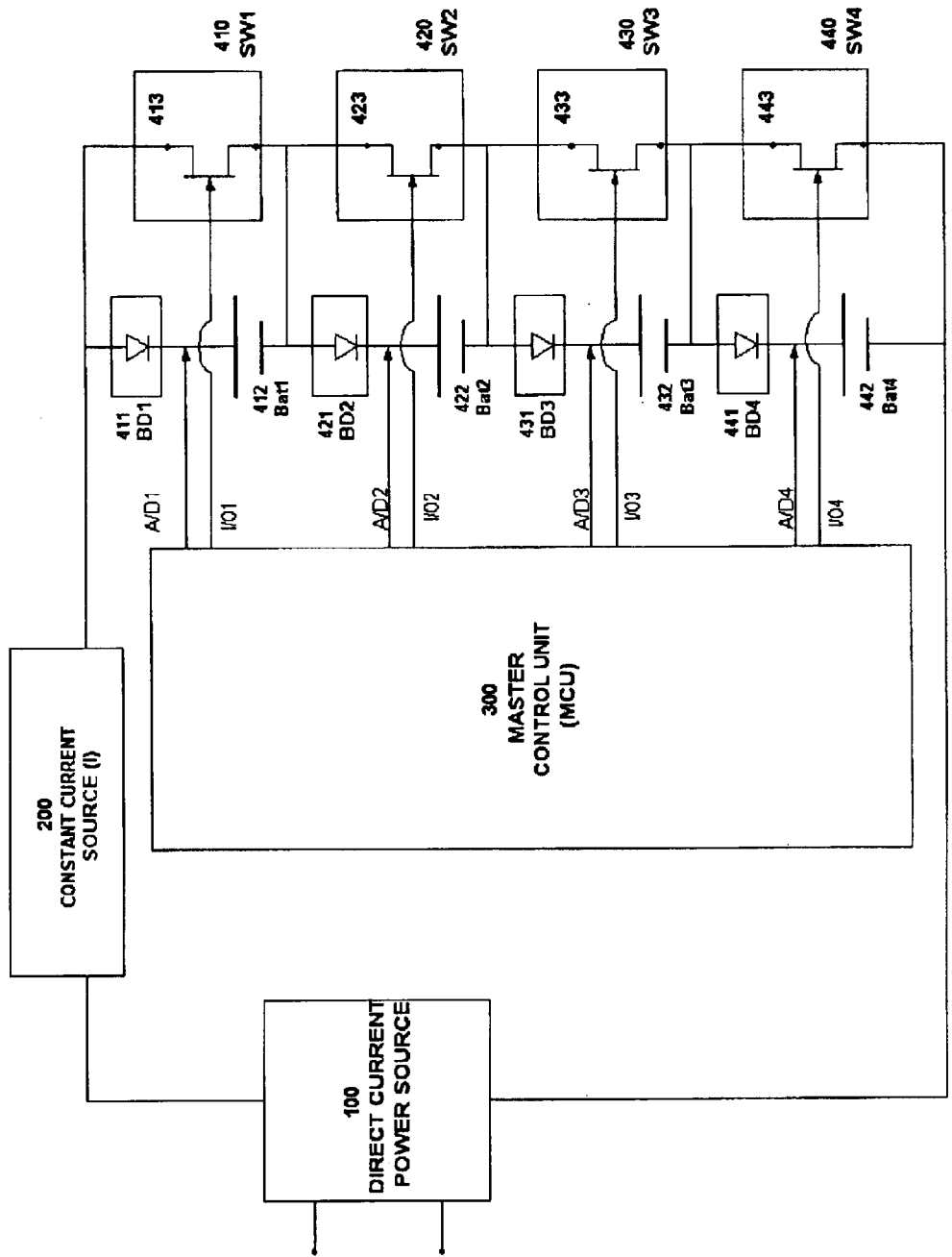
FIG. 2 is a block diagram showing a specific example of the components used in each of the serial charging sections.

Referring to FIG. 2, there is shown a preferred embodiment of the present invention in which a specific combination of a one-way electronic device and a bypassing switch are shown. In this embodiment, a MOSFET is used as a bypassing switch and a diode is used as a one-way electronic device. The diode is connected in series with the battery terminals in the manner as shown in FIG. 2 so that charging current can flow into the battery through a low-impedance path while reverse current flow is blocked. When the MOSFET bypassing switch (413, etc.) is turned on, the drain-source impedance becomes very low and the drain-source voltage is therefore also very low which is typically in the region of 0.2 volt. Since such a low voltage across the drain and source terminals is far from the turn-on voltage of the diode which is typically in the region of 0.6 volt, the diode becomes a high-impedance blocking device which prevents current from flowing into the battery. By the synergetic utilization of the combined characteristics of the two devices, namely, the low drain-source voltage of about 0.2 volt when a MOSFET is turned on and the high turn-on voltage of about 0.6 volt for a diode, a battery charger or battery charging section satisfying the afore-said conflicting requirements can be provided. As shown in the Figures, a plurality of charging sections can be connected in series in order to provide a preferred serial charger.

Figure 3:
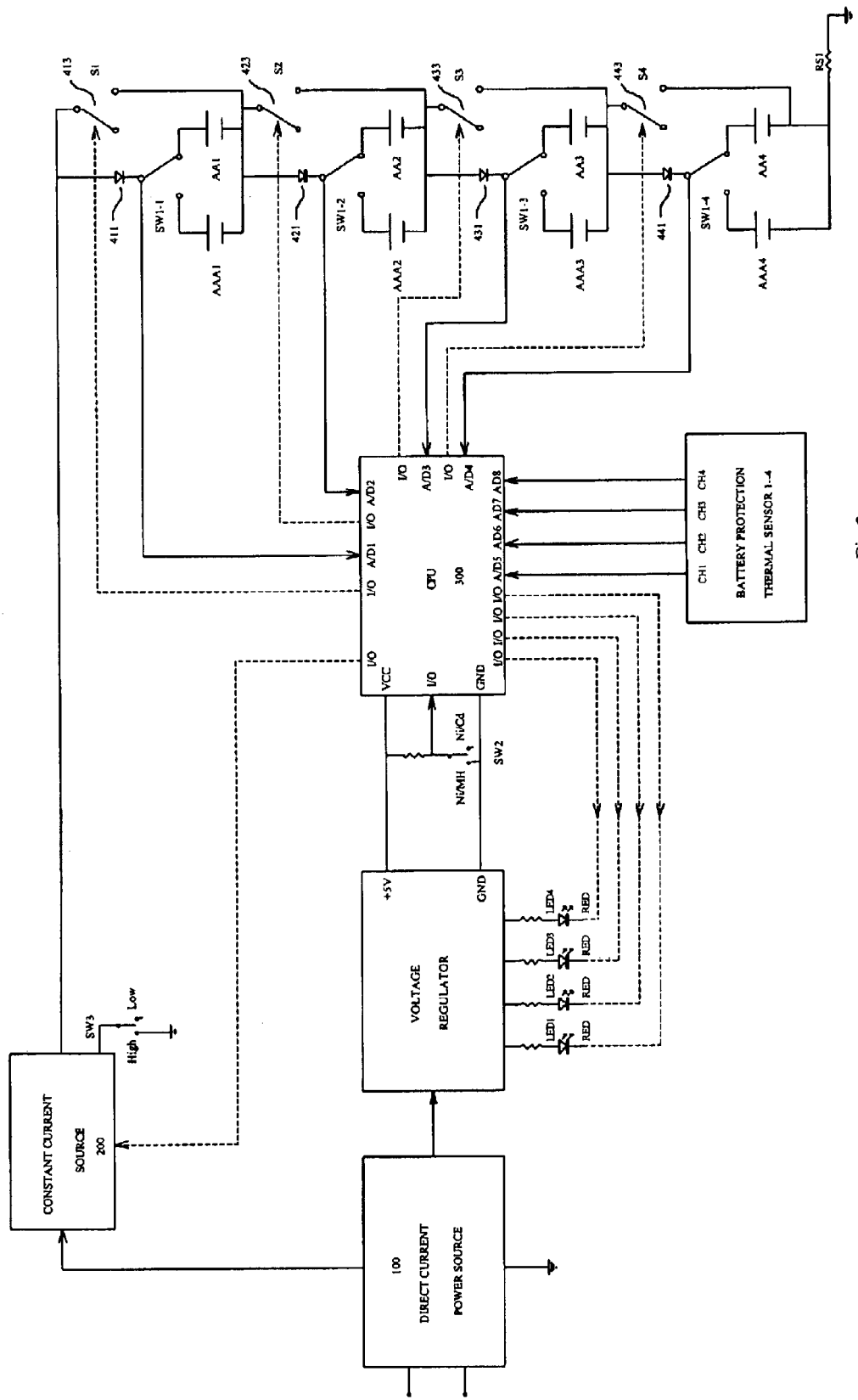
FIG. 3 is a general circuit diagram showing more connection particulars of the serial battery charging of FIGS. 1 and 2.

Referring to FIG. 3, there is shown a schematic diagram showing more detailed connection between the power source (100), current source (200), CPU (300) and the serially connected charging sections (410, 420, 430, 440). Each of the charging section includes a blocking diode (411, etc.) which prevents reverse flow of current out of the battery as well as providing a high-impedance isolation of the battery terminals when the low-impedance switch (413, etc.) is turned on, even though at that instant, the diode is under a small forward bias. In this specific embodiment and as shown in FIG. 3, each charging section is provided with receptacles for alternatively charging a AAA or a AA battery.

Figure 4:
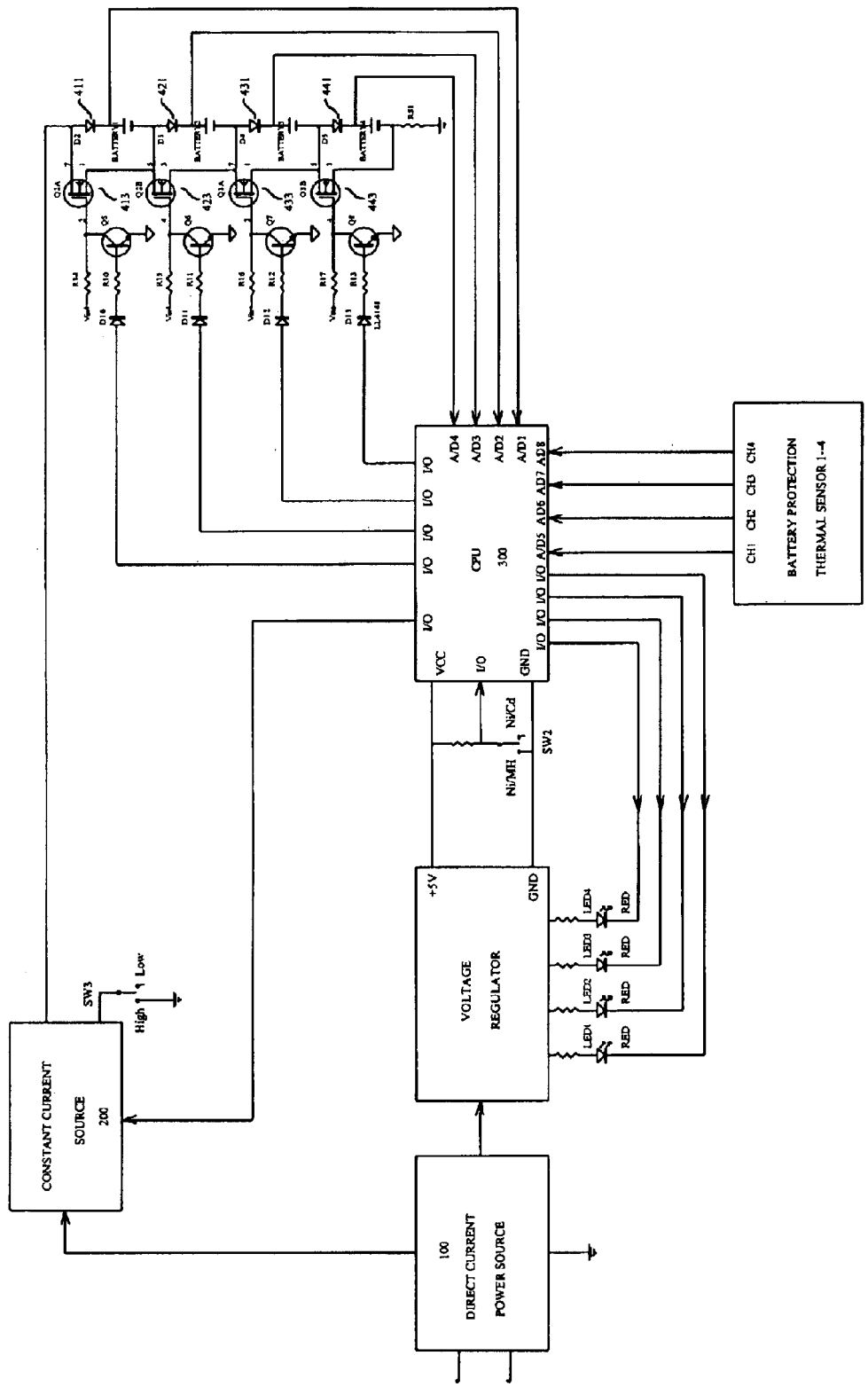
FIG. 4 is a general circuit diagram showing more detailed hardware connection of a first preferred embodiment of the present fast serial battery charger.

Referring to FIG. 4, there is shown a more detailed circuit arrangements of the charging sections of FIG. 3. In this specific embodiment, the bypassing MOSFETs, the blocking diodes as well as the MOSFET gate controlling circuitry which is connected between the bypassing MOSFETs and the CPU is described in more detail. This gate control circuitry is intended to provide only a working example of the control of the bypassing switch, many other circuit variations are of course possible to achieve substantially same or similar effects.

Figure 5:
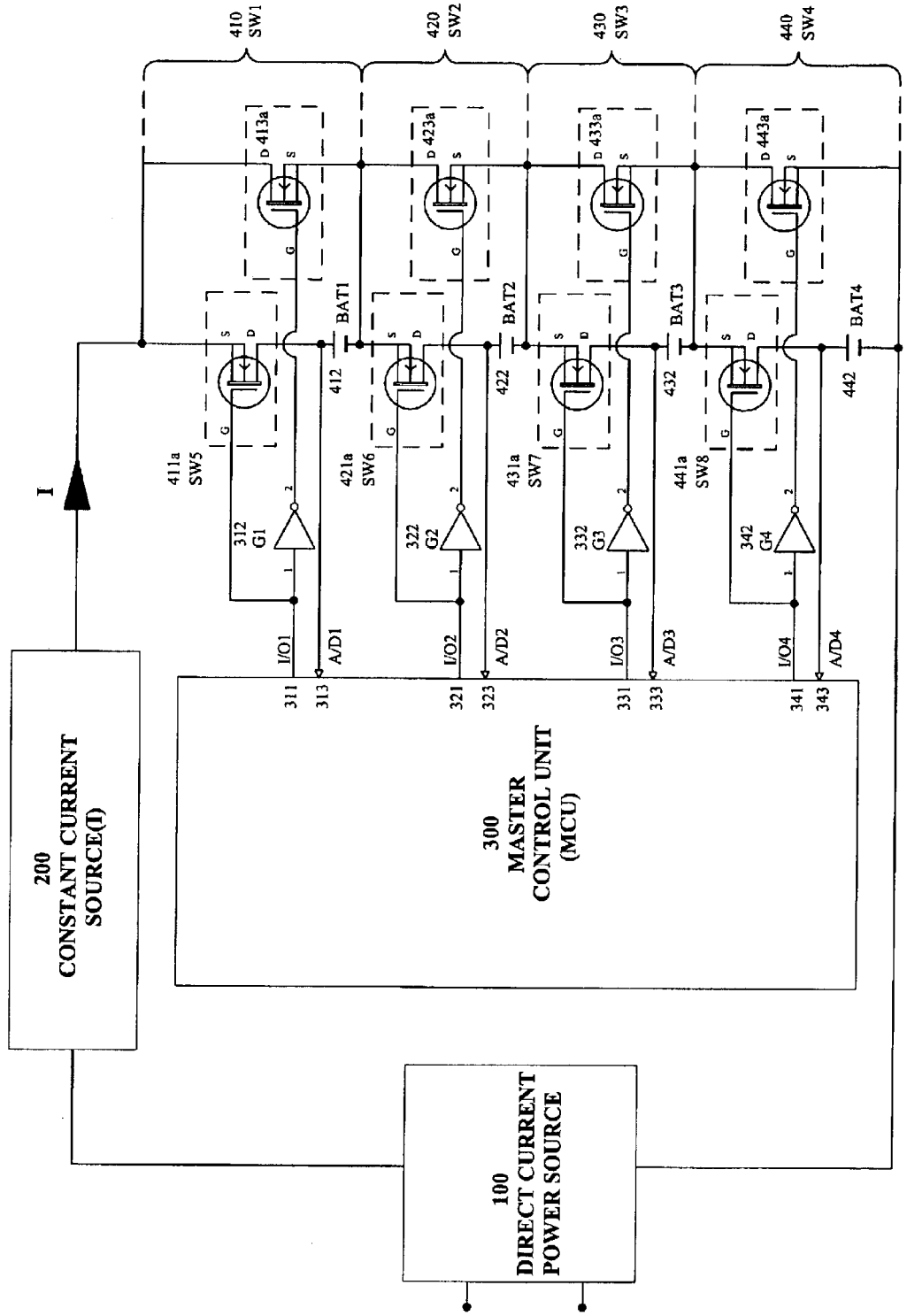
FIG. 5 is a hybrid block and circuit diagram showing a second preferred embodiment of a serial battery charger of the present invention.

Referring to FIGS. 1 and 5, there is shown a hybrid block and circuit diagram showing an example of a second preferred embodiment of the present invention of an intelligent serial battery charger. The battery charger includes a direct current power source (100), a constant current source (200), a micro-controller unit (300) and a plurality of battery charging sections (410, 420, 430 and 440) connected in series. The serially connected battery charging sections are connected to the positive and negative terminals of the direct current power source (100) in order to obtain DC power of the correct polarity.

Referring to FIG. 5, each of the charging sections (410, 420, 430 and 440) includes a one-way electronic device (411a, 421a, 431a, 441a) which is connected in series with the positive and negative terminals of the battery in order to control the charging of the battery. In order to provide a controllable bypassing path with a low impedance shunting across a selected charging section when necessary, for example, when the battery in a particular charging section is fully charged, defective or overheated, an electronic controllable bypassing switch (413a–443a) is connected across each of the charging sections. As shown in the Figure, the bypassing (413) switch is connected in parallel with the serial connection of the battery terminals and the one-way electronic device. The bypassing switch provides a low impedance shunting across the terminals of the serial connection of the one-way electronic device and the battery terminals when activated. In the present specific embodiments, the bypassing switch is a three-terminal device in which the impedance across two of its terminals is controllable by a third terminal and the other two terminals are connected across the serial connection of the battery charging terminals and the one-way electronic device. Of course, other appropriate bypassing switches can be used.

The one-way electronic device or blocking device (411, 421, 431, 441) which is inserted in series with the battery being charged will generally fulfil the following conflicting requirements. Firstly, it has a low or very low impedance when the battery is being charged (that is, when forward charging current flows into the battery). Secondly, it has a high or very high impedance when it is necessary to isolate the battery from other batteries or other charging sections or when there is no power supply from the charger or, in other words, when the voltage at the battery terminals exceeds that of the charging terminals to alleviate or obviate adverse discharge or reverse current flowing from the battery, otherwise, the batteries will be drained when there is no power supply from the direct current power source (100). Thirdly, the one-way electronic device or blocking device should have a very high impedance when the bypassing switch has been turned on because, otherwise, a current loop, which includes the battery, the one-way electronic device (or blocking device) and the bypassing switch, may cause burning out of the circuit. This is because the bypassing switch has a very low impedance and the resulting current in the current loop can be very large. In addition, the one-way electronic device or the blocking device should have a considerably higher impedance than that of the activated bypassing switch (i.e. when the bypassing switch has been turned on or activated) and when the voltage at the charging terminals exceeds that of the battery, so that adverse current will not flow into the battery through the one-way electronic device.

In the present specification, and unless the context otherwise requires, the term "one-way electronic means" is generally used to refer to a means or device which allows current flow in a single direction, whether such a unidirectional characteristic is inherent, for example, in the case of a diode or a triac, or non-inherent, for example, by appropriate configuration of a MOSFET. More particularly, it will be noted that the one-way electronic device is utilized in the present invention so that it allows charging current to flow into said battery but substantially prevents discharge of said battery through said one-way electronic device.

In this second preferred embodiment as shown in FIG. 5, a field effect transistor (FET), such as a Metal-Oxide-Semiconductor-Field-Effect-Transistor (MOSFET), is used as an example of a suitable one-way electronic device for serial connection with the battery charging terminals of a battery charging section. The FET employed in this specific example is a N-channel enhancement mode field effect transistor with the Model No. CDM60ND02 available from CET (Chino-Excel Technology Corporation) and in a SO-8 package comprising two MOSFETS. The MOSFET is configured as a one-way electronic device so that current is only allowed to flow along a single direction.

The one-way electronic device in this example is a 3-terminal device in which the impedance across two of its terminals (namely, the drain(D)- and the source(S)- terminals) is controllable by a third terminal, namely, the gate terminal G.

In this specific example and referring to the first charging section 410, the source-terminal(S) and the drain-terminal (D) of the MOSFET 411 are respectively connected to the higher and lower potential points of the charging section, so that charging current will flow from the source terminal into the battery 412 via the drain terminal of the MOSFET one-way electronic device 411.

The bypassing switch 413 in this example is a 3-terminal device in which the impedance across two of its terminals is controllable by a third terminal. In this specific example, a MOSFET of the same type, namely, a N-channel enhancement mode MOSFET CDM60ND02, is used as the bypassing switch 413. The CDM60ND02 MOSFET includes a protection diode connected across the drain- and source-terminals, with the anode connected to the source and the cathode to the drain terminal of the MOSFET. This connection topology is generally provided to alleviate the risk of battery current discharge through the protective diode when the one-way electronic device has been deactivated or turned off, since, otherwise, reverse current may flow out of the battery through the otherwise formally biased protective diode of the one-way electronic device 411 as terminal voltage of the battery at this instant may be dominant in the circuit loop comprising the protective diode and the bypassing switch.

Furthermore, the inputs to the control terminals of the bypassing switch 413 and the one-way electronic device 411 are connected to the same control port of the MCV (311, 321, 331, 341) but with a logic inversion means 312, such as an invertor, connected to the control terminal of either the bypassing switch or the one-way electronic device. With this circuit arrangement and, since the MOSFETs are of the same properties, when the one-way electronic device is activated or actuated, the bypassing switch will be deactivated or de-actuated and vice versa.

Turning to the operation of this serial battery charger, when a battery (412, 422, 432, 442) has been fully charged, is defective or is to be removed from the charging circuitry, the microcontroller can selectively activate the bypassing switch by sending a control signal to the control port (311, 321, 331, 341). In this specific embodiment, the control signal will be a "low"-logic signal appearing at the control port (311, 321, 331, 341) which will turn off or deactivate the one-way electronic device and at the same time turn on the bypassing switch.

When the bypassing switch (any one of 413a, 423a, 433a, 443a) has been activated, current originating from the constant current source will flow through the shunt branch containing the bypassing switch (the corresponding 413a, 423a, 433a, 443a) and flow into the other charging sections or even possibly bypassing all batteries. At that time, the relevant one-way electronic device has been deactivated and turned into a high-impedance device which substantially isolates the battery or the battery charging terminals from the loop comprising the battery (or the battery charging terminals), the one-way electronic device and the bypassing switch, thereby alleviating the risk of reverse current flowing from the battery into the bypassing switch or other sections of the battery chargers. Furthermore, as the protective diode of the MOSFET is connected with its cathode immediately adjacent the positive terminal of the battery, the protective diode will not be forward biased by the battery.

Thus, it will be apparent from an explanation of the first charging section 410 of the present specific embodiment that the one-way electronic device 411 is configured to allow current flow in a single direction, i.e., into the battery being charged but not otherwise. Furthermore, in order to constantly monitor the charging conditions of the battery and, for example, to ensure that the controllable one-way electronic device will be de-activated once the detected battery terminal voltage exceeds that of the charging section, a connection is made between the voltage terminals of the battery and the input port of the microcontroller with the microcontroller being programmed to monitor at regular intervals the instantaneous voltage of the battery being charged. Similarly, when it is necessary to selectively isolate or remove a battery from the charging current, other batteries or the other charging sections, the microcontroller 300 will send the bypassing activation signal to the control port 311 to activate the bypassing switch (413, 423, 433, 443). When the bypassing switch has been selectively activated, the one-way electronic device will be de-activated, thereby providing a high impedance blocking means between the battery and the remaining portion of the circuit loop and thus protecting the battery as well as the remaining portion of the circuit or even the battery chargers. Of course, the batteries in any of the charging sections (410, 420, 430, 440) can be selectively isolated by the selective activation of the bypassing switch for measurement of open circuit parameters or other electrical characteristics without loss of generality.

Figure 6:
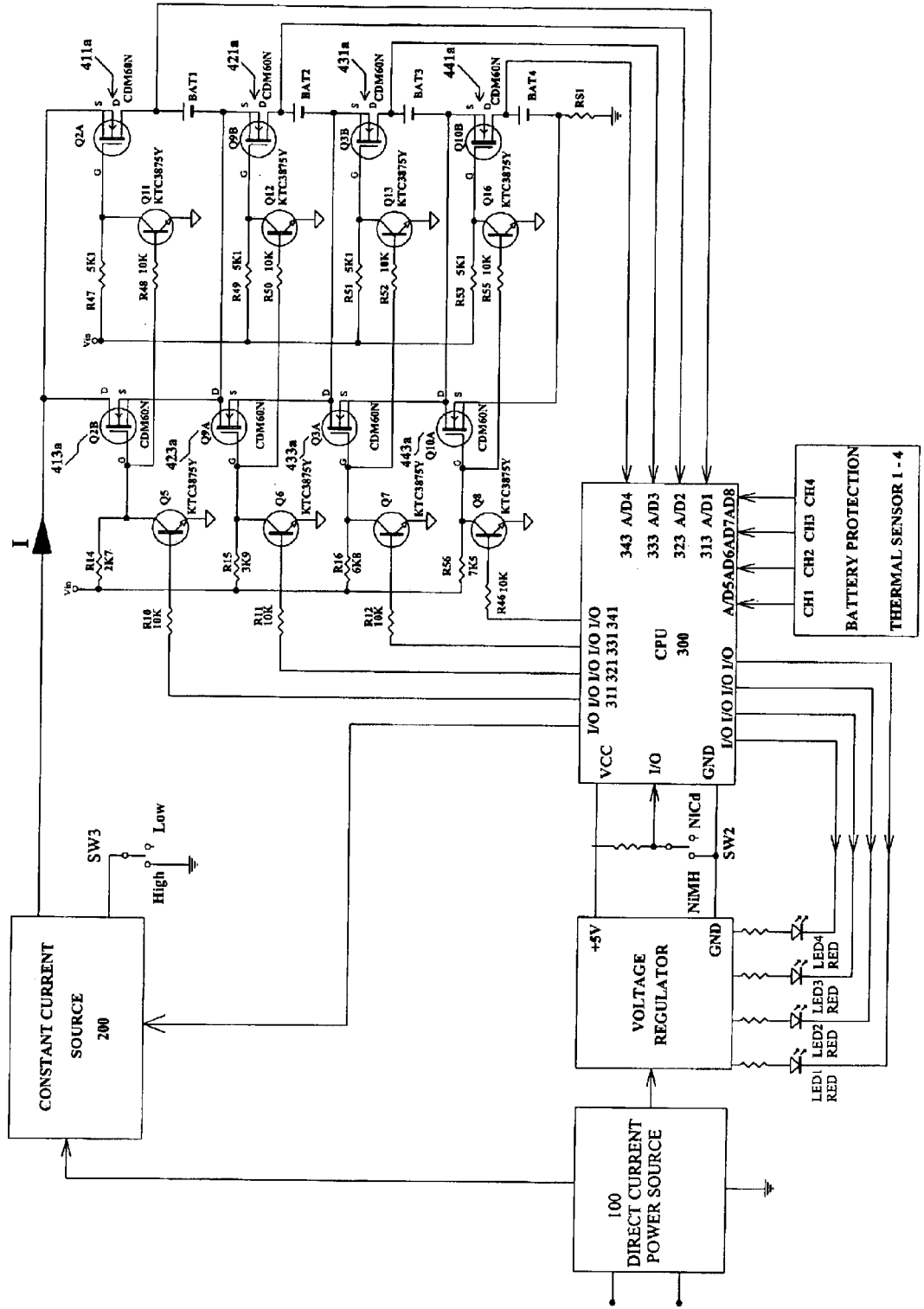
FIG. 6 is a hybrid block and circuit diagram showing a third preferred embodiment of a serial battery charger of the present invention.

Referring to FIG. 6, there is shown a third preferred embodiment of the present invention of a serial battery charger which is generally identical to the charger of FIG. 4 but with modifications made to the circuitry of the charging sections. The circuitry of the charging sections in this preferred embodiment is generally similar to that shown in FIG. 5, except that the invertor circuit is shown in more detail.

Furthermore, while diodes and MOSFETS have been used as examples to illustrate their application as one-way electronic devices, it will be appreciated that other semiconductor devices, such as, for example, silicon controlled rectifiers (SCR), insulated gate bipolar transistors (IGBT), silicon controlled switches (SCS), bipolar transistors (BJT), opto-couplers, can also be used although it may require certain modifications to effect as a one-way electronic device. Furthermore, while a MOSFET bypassing switch has been used as an explanation in the above specification, it would be appreciated by persons skilled in the art that other switching or semiconductor devices can also be used as appropriate bypassing switches or devices.

While the present invention has been explained by reference to the various specific examples described above, it should be appreciated that those examples are merely provided to assist understanding only and should not in any way be used to limit or restrict the scope of the present invention. In addition, it should be appreciated that the scope of the present invention shall be interpreted according to the spirit of the invention as described in the above description and should therefore cover modifications or variations which are obvious or trivial to persons skilled in the art. In particular, the present invention has disclosed a synergetic utilization of a combination of rather simple components to proffer a circuitry or circuit arrangements in which the various conflicting requirements for battery charging sections are accommodated and provided in a very simple way and by using relative simple components and in a simple arrangement.

What is claimed is:

1. A battery charger including a plurality of battery charging sections which are connected in series and a charging current source, each said charging section including at least a first branch and a second branch which are connected in parallel, said first parallel branch including an electronically controllable bypassing switch, said second parallel branch includes terminals for receiving the positive and negative terminals of a battery and a one-way electronic device which are connected in series, said bypassing switch having a very low impedance when activated or turned-on and a very high impedance when deactivated or turned-off, wherein said one-way electronic device is characterized by a very low-impedance when current flows from said charging section into said battery terminals and a high-impedance when said bypassing switch is activated, and wherein said one-way electronic device allows charging current to flow into said battery but substantially prevents discharge of said battery through said one-way electronic device, said bypassing switches of said plurality of battery charging sections being selectively activatable, said battery charger further comprising control means for selective activation of said bypassing switches and voltage measuring means for measuring terminal voltage of the batteries connected to said battery charging sections, whereby the voltage of a battery in a selected charging section is measured upon selective activation of said bypassing switches.

2. A battery charger according to claim 1, wherein said control and voltage measuring means are adapted so that when the voltage of a battery in a selected battery charging section is to be measured, the bypassing switches of the battery charging sections downstream of said selected battery charging section are activated during measurement of the battery terminal voltage, whereby the negative terminal of the battery in said selected battery charging section is connected to the reference ground of said battery charger.

3. A battery charger according to claim 2, wherein only the positive terminal voltage of the battery in said selected battery charging section is output to said voltage measuring means when the voltage of the battery in said selected battery charging section is being measured.

4. A battery charger according to claim 1, wherein said control and voltage measuring means are adapted so that when the voltage of a battery in a selected battery charging section is to be measured, bypassing switches of the battery charging sections downstream of said selected battery charging section are activated so that the negative terminal of the battery in said selected battery charging section is connected to the reference ground of said battery charger.

5. A battery charger according to claim 4, wherein only the positive terminal voltage of a battery in said selected battery charging section is measured when the voltage of said battery in said selected battery charging section is being measured.

6. A battery charger according to claim 1, wherein only the positive battery terminal voltage is output to said voltage measuring means when measuring the voltage of a battery in a selected battery charging section and only a single voltage output is needed for measuring the voltage of a battery in a selected battery charging section.

7. A battery charger according to claim 6, wherein the measurement of the voltage of a battery in a selected battery charging section comprises a single measurement of a single battery terminal voltage output.

8. A battery charger according to claim 1, wherein the voltage of a battery connected to a selected battery charging section is obtained by measuring the positive terminal voltage of said battery upon activation of the bypassing switches of the battery charging sections downstream of said selected battery charging section, whereby the negative terminal of the battery in said selected battery charging section is connected to the reference ground of said battery charger.

9. A battery charger according to claim 8, wherein the bypassing switch of said selected battery charging section is de-activated when the voltage of a battery in said selected battery charging section is being measured, whereby the batteries in battery charging sections downstream of said selected battery charging section are isolated from the charging current by said one-way electronic device of said selected battery charging section during voltage measurement.

10. A battery charger according to claim 1, wherein said control and voltage measuring means are adapted for high-frequency and repeated open-circuit voltage measurements, so that disruption to battery charging will be minimal.

11. A battery charger according to claim 1, wherein said control and voltage measuring means, said one-way electronic devices and said bypassing switches are adapted for open-circuit voltage measurements of the batteries connected to said battery charging sections.

12. A battery charger according to claim 11, wherein the bypassing switches of the battery charging sections downstream of said selected battery charging section are activated when the voltage of the battery connected to said selected battery charging section is being measured, whereby the batteries in said downstream battery charging sections are isolated from the charging current and other batteries during voltage measurement.

13. A battery charger according to claim 1, wherein said voltage measuring means comprises means for measuring a single voltage output from a charging section.

14. A battery charger according to claim 13, wherein said single voltage output is the positive terminal voltage of the battery in a selected battery charging section the voltage of which is being measured.

15. A battery charger according to claim 13, wherein a single voltage output connection is provided from each battery charging section for battery voltage measurements.

16. A battery charger according to claim 1, wherein the voltage of a battery connected to a selected battery charging section is obtained by measuring the terminal voltage of said battery upon isolation of the batteries immediately downstream of said selected battery charging section.

17. A battery charger according to claim 1, wherein said one-way electronic devices and said bypassing switches are both MOSFETS.

18. A battery charger according to claim 17, wherein the activation states of said bypassing switch and said one-way electronic device of the same battery charging section are opposite.

19. A battery charger including a plurality of battery charging sections which are connected in series and a charging current source, each said charging section including at least a first branch and a second branch which are connected in parallel, said first parallel branch including an electronically controllable bypassing switch, said second parallel branch including terminals for receiving the positive and negative terminals of a battery and a one-way electronic device which are connected in series, said bypassing switch having a very low impedance when activated or turned-on and a very high impedance when deactivated or turned-off, wherein said one-way electronic device is characterized by a very low-impedance when current flows from said charging section into said battery terminals and a high-impedance when said bypassing switch is activated, and wherein said one-way electronic device allows charging current to flow into said battery but substantially prevents discharge of said battery through said one-way electronic device, said one-way electronic device and said bypassing switch of said first and second branches of a charging section being configured so that no current will be discharged from a battery in a charging section either via first branch or said second branch and such that said first and second branches do not form a current loop when a bypassing switch is actuated.

20. A method of measuring the voltage of a battery connected to a selected battery charging section of a battery charger of claim 1, comprising the steps of isolating said battery from said selected battery charging section, connecting the negative terminal of said battery to the ground of said battery charger by activating the bypassing switches of the battery charging sections downstream of said selected battery charging section so that the negative terminal of said battery in said selected battery charging section is connected to the reference ground of said battery charger, and measuring the battery terminal voltage.

* * * * *